Figure 1:
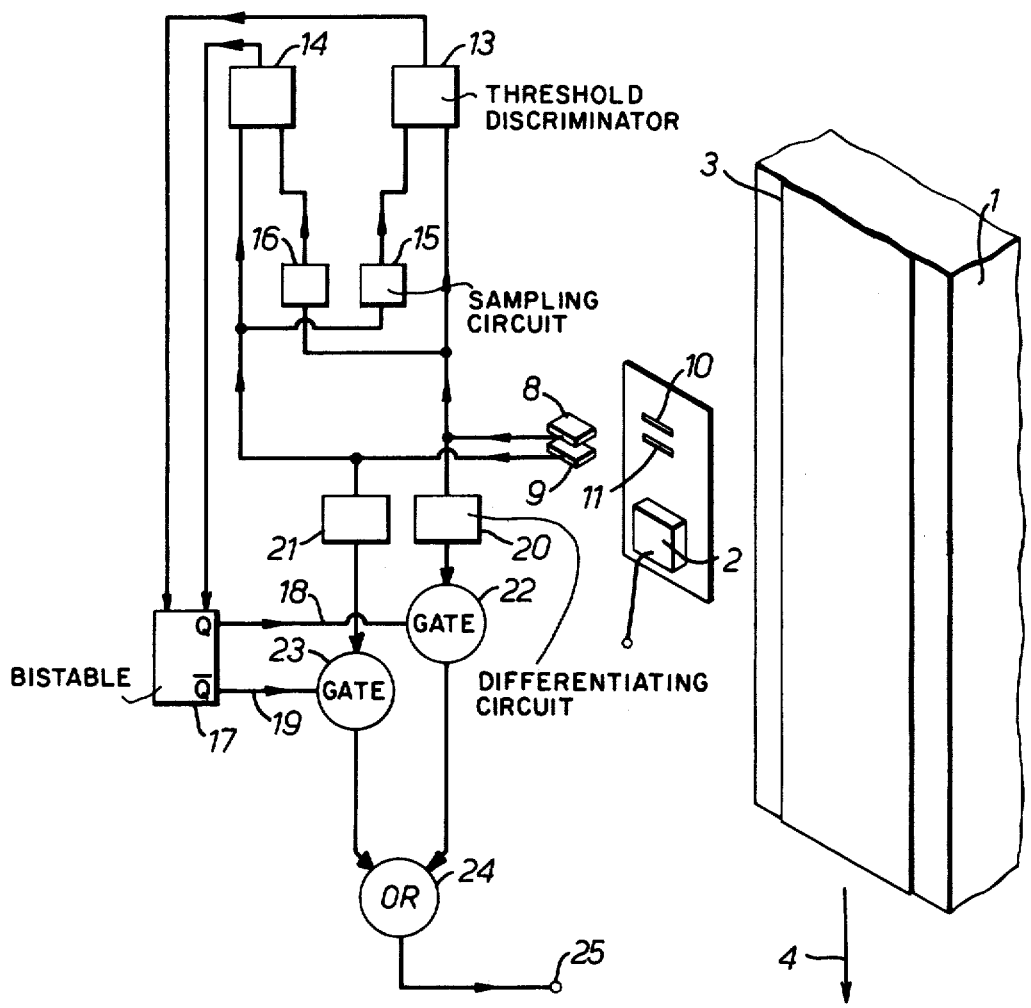

United States Patent [19]

Humphries et al.

[11] 4,314,153
[45] Feb. 2, 1982

[54] OPTICAL VELOCITY RESPONSIVE APPARATUS AND ARRANGEMENTS

[75] Inventors: John M. Humphries, Hornchurch; Ivor R. Baxter, Brentwood; David G. F. Fripp, Chelmsford, all of England

[73] Assignee: The Marconi Company Limited, Chelmsford, England

[21] Appl. No.: 8,087

[22] Filed: Jan. 31, 1979

[30] Foreign Application Priority Data

Feb. 1, 1978 [GB] United Kingdom ............... 3961/78

[51] Int. Cl.³ ............................................ G01D 5/34
[52] U.S. Cl. ........................ 250/231 SE; 250/237 R
[58] Field of Search ............... 250/231 SE, 237 R; 340/347 D; 356/395

[56] References Cited

FOREIGN PATENT DOCUMENTS

| 1146266 | 3/1963 | Fed. Rep. of Germany . |
| 1773149 | 9/1971 | Fed. Rep. of Germany . |
| 2214389 | 8/1974 | France . |
| 717686 | 11/1954 | United Kingdom . |
| 953036 | 3/1964 | United Kingdom . |
| 1200528 | 7/1970 | United Kingdom . |
| 1203597 | 8/1970 | United Kingdom . |
| 1445037 | 8/1976 | United Kingdom . |

Primary Examiner—David C. Nelms
Assistant Examiner—Darwin R. Hostetter
Attorney, Agent, or Firm—Diller, Ramik & Wight

[57] ABSTRACT

When monitoring the velocity of a moving surface an indication of the direction of movement is given by providing, on the moving surface, a pattern or shape. This is viewed by a detector which, because of the nature of the pattern or shape, produces a signal which identifies the direction of movement of the surface.

22 Claims, 7 Drawing Figures

OPTICAL VELOCITY RESPONSIVE APPARATUS AND ARRANGEMENTS

This invention relates to optical velocity responsive apparatus and arrangements.

Optical velocity responsive apparatus are known in which light reflected by a moving surface is received by a sensor, which provides an electrical output signal having a frequency component which is related to the velocity of the moving surface.

In many cases, for such purposes as checking the emergency braking time of industrial machines, it is often desirable to determine if a reversal in the direction of motion occurs and it is one object of the present invention to provide an improved optical velocity responsive arrangement which is capable of generating a signal in such circumstances.

According to this invention an arrangement for checking or monitoring the velocity of a moving surface comprises means providing, or for providing, on said moving surface a pattern consisting of a series of shapes and a detector provided to view said series of shapes through an aperture, each of said shapes having a profile such that the signal generated by said detector has a characteristic dependent upon the direction of passage of said pattern past said aperture.

Preferably said shapes are triangles.

Preferably said triangles are arranged in a series with the base of one overlapping the apex of another and preferably again for each triangle in the series the apex leads the base relative to the direction of movement of said pattern.

Preferably two detectors and two apertures (which may be slits) are provided to view the same series of shapes, the arrangement being such that one aperture views a portion of a triangle approximately mid way along the height (i.e. the dimension in the direction of movement) of the triangle whilst the other aperture is viewing the region of transition between that triangle and the next following triangle.

Preferably the output of said detector or each detector is applied to a differentiating circuit in order to produce a direct current having a polarity dependent upon the direction of movement of said pattern.

Preferably, where two detectors and two apertures are provided, the output of each detector is applied to a respective differentiating circuit the outputs of which are passed through respective gates to a combining circuit, means being provided for rendering conductive that gate which is connected in the output of that discriminator to which that detector is connected which for the time being is providing an output waveform which is rising between two amplitude levels.

Preferably said last mentioned means comprises a bistable circuit which is connected to open one of said gates in one state and the other of said gates in its other state, the state of said bistable circuit being arranged to be controlled by two amplitude discriminator circuits to one of which the output of one detector is connected with a proportion of the output of the other detector as reference and to the other of which the output of the other detector is connected with a proportion of the output of the one detector as reference whereby as the output of the one detector exceeds the threshold provided by the other detector the gate at the output of that discriminating circuit to which the output of the one detector is applied is rendered conductive, and vice versa.

Preferably said proportion, in each case, is of the order of 30% or 50%.

The outputs of said gates are normally connected to a common terminal providing a single output signal the polarity of which is related to the direction of passage of said pattern past said slits.

Said pattern may comprise a sheet which is adapted to be attached to said moving surface, for example, magnetically and, in addition to said series of shapes, a grating pattern may be applied to said moving surface to enhance an optical signal reflected from said surface and utilised to monitor the velocity of said moving surface.

Instead of using a pattern which consists of a series of shapes it is possible to use a pattern consisting of a single tapered shape or to use a pattern of constant width which varies in darkness either continuously from one end to the other or repeatedly in sections.

Another possibility is to use a pattern constituted by a series of lines extending across the direction of movement and to view these using either a triangular or otherwise tapered photosensor or through a tapered aperture.

Accordingly, another aspect of this invention provides apparatus for monitoring movement of a moving surface characterised by a pattern or shape which moves with the moving surface, and a detector arranged to view the pattern or shape as it moves, the pattern or shape being such as to make the detector produce a signal which identifies the direction of movement of the surface.

According to yet another aspect of this invention there is provided apparatus in which the pattern defining means defines a repeated pattern unit; two optical detectors are provided such that when one receives light from a position between two pattern units, the other receives light from a position exclusive to one of the pattern units; and means is provided for rejecting signals from a detector receiving light from positions between two pattern units.

Figure 2:
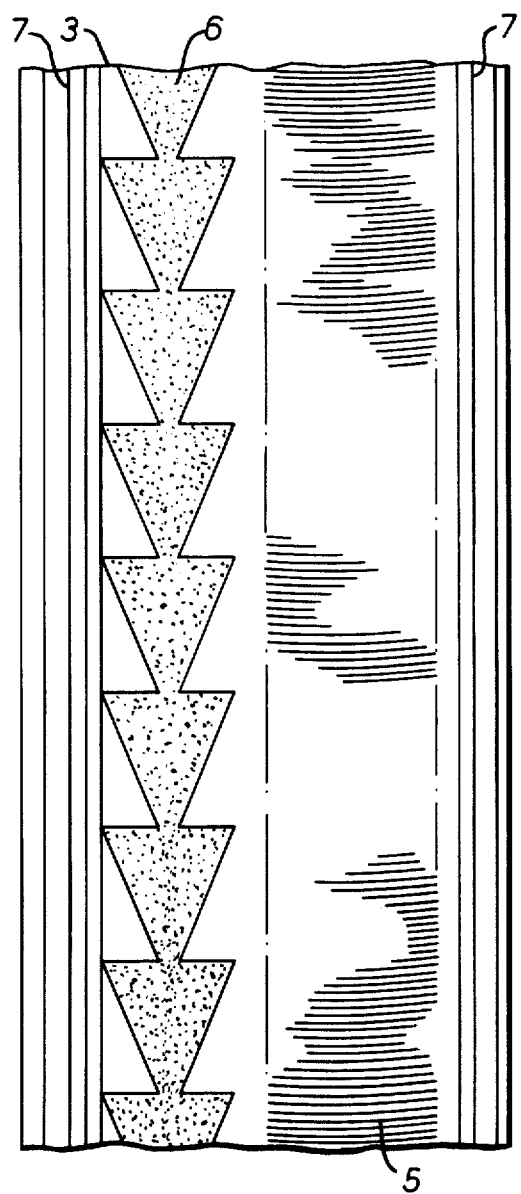
Figure 3:
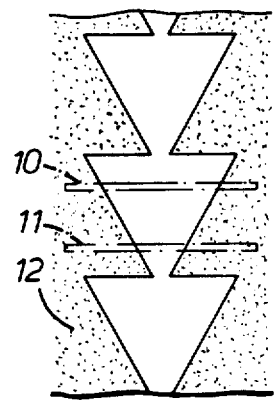
Figure 3A:
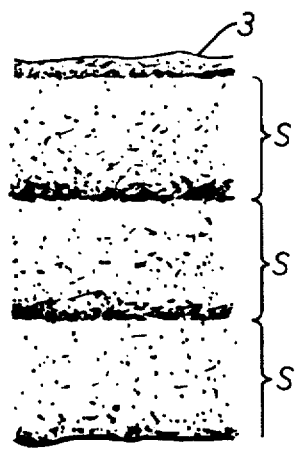
Figure 3B:
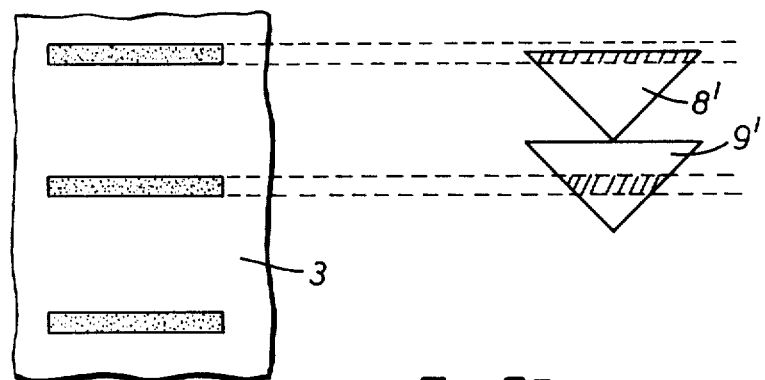
Figure 4:
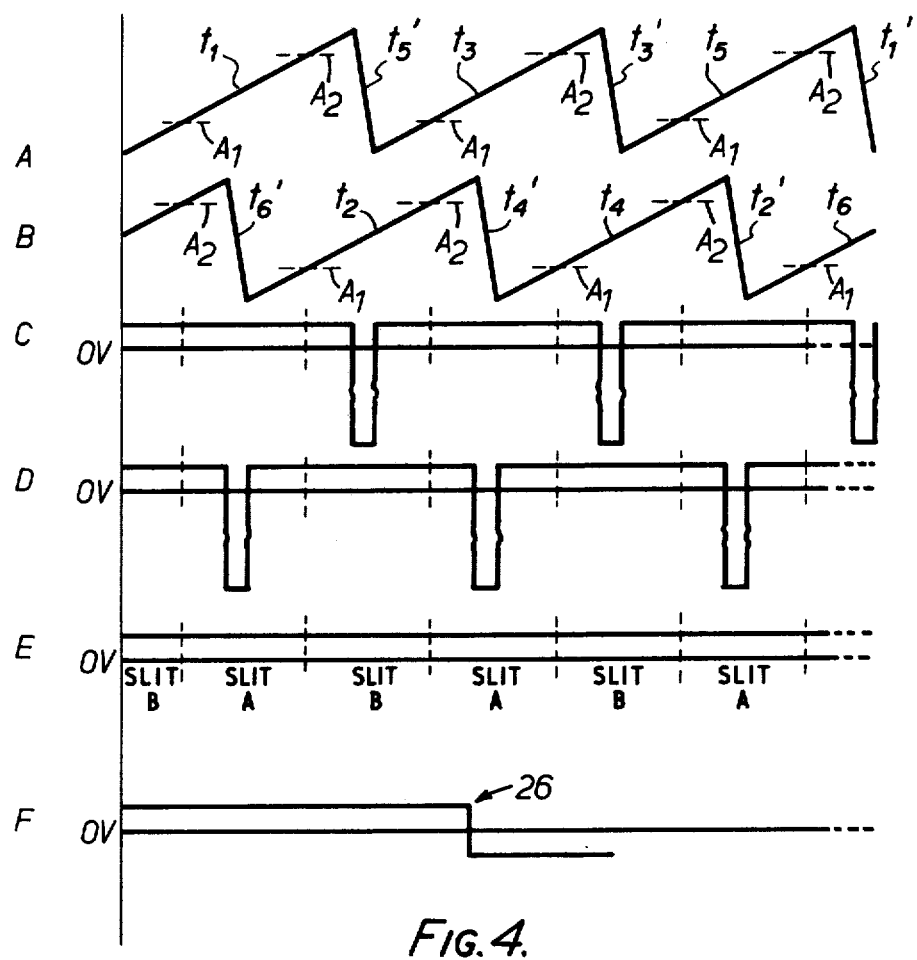
Figure 5:
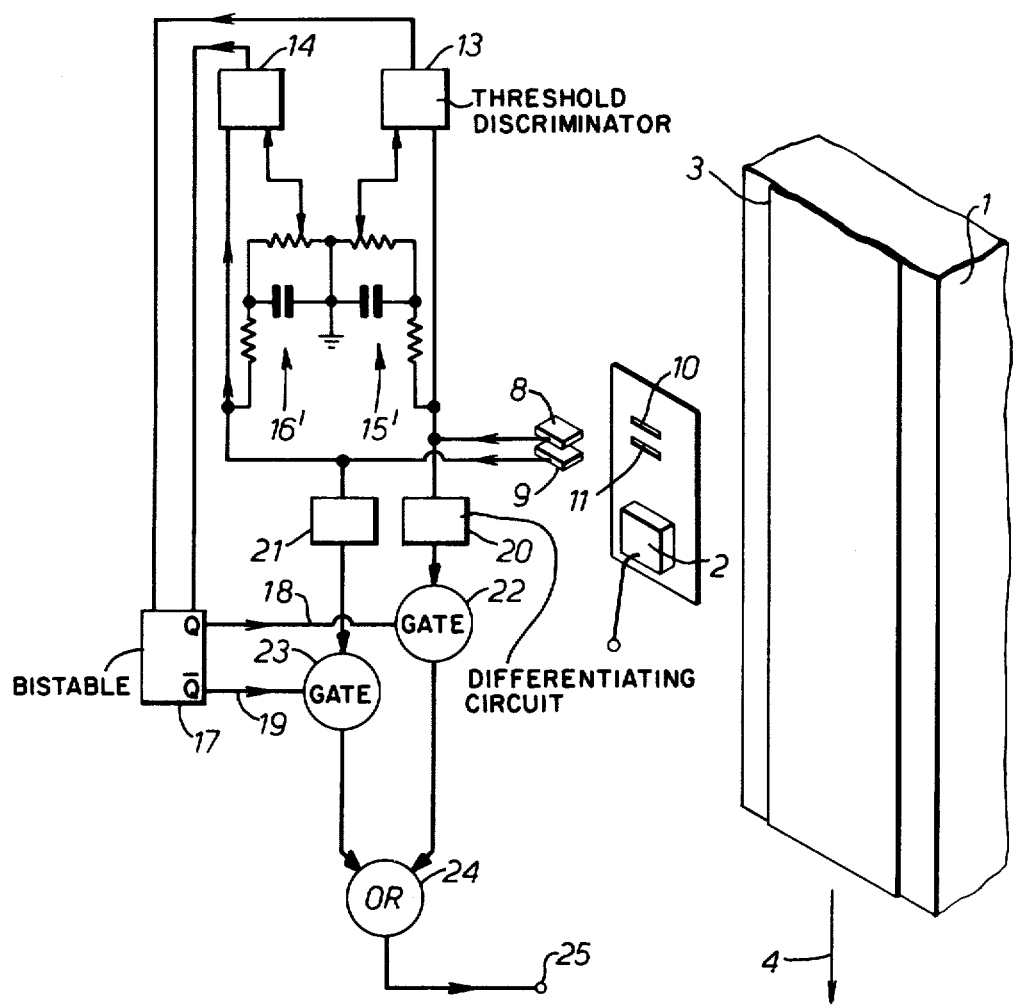

The invention is illustrated in and further described with reference to the accompanying drawings in which;

FIG. 1 is a highly schematic diagram illustrating one optical velocity responsive apparatus in accordance with the present invention, FIG. 2 illustrates one practical embodiment of a patterned sheet used in the arrangement of FIG. 1, FIGS. 3, 3A and 3B are explanatory diagrams, FIG. 4 is an explanatory graphical diagram, and FIG. 5 is a schematic diagram showing an apparatus similar to that of FIG. 1 but incorporating some modifications.

Referring to FIG. 1, a moving part of an industrial machine, such as a power press, is represented at 1. The requirement is to determine the emergency braking time of the machine, that is to say the time which elapses between the initiation of emergency shut down and the moment at which the member 1 comes to a stop. In order to determine this time, apparatus represented at 2 is positioned to monitor the velocity of the member 1 and in order to enhance the signal to noise ratio in the optical signal received by the optical velocity responsive apparatus a sheet 3 having a grating pattern thereon is attached to the surface of the member 1 so that the sheet 3 moves within the field of view of the sensor of the apparatus 2, in the direction of the arrow 4, during the "power" stroke of the machine.

A practical example of the sheet 3 is shown in FIG. 2 where the grating pattern referred to above, is shown at 5.

As may be observed from FIG. 2, the sheet 3 contains additional to the grating marks 5, a pattern of triangles 6, which are continuous, the apex of one triangle being overlapped by the base of the next to a small extent. The sheet 3 also contains lines 7 extending along the edges of the sheet 3 which are provided for the purpose of setting up the optical system of the apparatus 2 in order to achieve a desired magnification factor.

Reverting to FIG. 1 the operation of the optical velocity responsive apparatus 2 in conjunction with the grating pattern 5 on the sheet 3 is as described in our co-pendng French application No. 78.12247 and need not be discussed further.

The present invention is concerned with the generation of a further signal which is capable of indicating the direction in which the sheet 3 is moving, or alternatively the time at which a change of direction occurs. In this present application a change of direction may occur if, for example, the member 1 vibrates as it comes to rest. It is for this purpose that the pattern 6 of triangles is provided. The triangles shown in FIGS. 2 and 3 overlap each other but it will be understood that in alternative embodiments of the invention the triangles could just touch each other or, more preferably, be spaced from each other by distances equal for example to the width of each slit.

The pattern 6 of triangles of sheet 3 is arranged to be viewed by two photodiode detectors referenced 8 and 9, the first through a slit 10 and the second through a slit 11. The slits 10 and 11 extend transversely to the direction of movement 4 of the member 1 and sheet 3.

The image received by each of the detectors 8 and 9 is best seen from FIG. 3. Here the triangles, of retro-reflective material upon a surrounding matt black background 12, are shown passing the slits 10 and 11 so that each of the detectors 8 and 9 will generate a signal the amplitude of which depends upon the relationship of a triangle to its slit at any given time. Thus in the instance illustrated in FIG. 3 detector 8 via slit 10, will generate a signal of amplitude three times that generated by the detector 9 viewing the triangle through its slit 11.

The outputs of the dectors 8 and 9 are shown respectively at A and B in FIG. 4 for the direction of motion indicated by the arrow 4 in FIG. 1.

Instead of using tapered triangular shapes, e.g. as shown in FIGS. 2 and 3 it is possible to use a pattern which is of varying darkness. Such a pattern is shown in FIG. 3A and includes a plurality of repreated sections S each varying in darkness from top to bottom. The varying shades of darkness can be produced by a multitude of dots as shown for convenience of reproduction on FIG. 3A, or can be a continuous variation, produced for example, photographically.

Another modification is shown in FIG. 3B. Here, the sheet 3 has a series of equally spaced lines marked on it. Images of these are projected, as shown schematically on FIG. 3B, onto two photosensitive devices 8' and 9'. These photosensitive devices have triangular or otherwise tapered areas of sensitivity so that, as the image of a line passes over it, the output varies to give an output similar to that shown at A or B on FIG. 4. Photodiodes having a triangular photosensitive member can easily be obtained. Alternatively a triangular aperture could be placed in front of a conventional photodiode to obtain the same effect. In yet another possibility a triangular aperture could be included in an optical system used to form the image of the lines on the sheet 3 onto the photosensitive devices.

The outputs of detectors 8 and 9 are applied to respective amplitude threshold discriminators 13 and 14. The reference level for discriminator 13 is derived from the output of detector 9 via a sampling circuit 15. The sampling circuit 15 provides $\frac{1}{3}$ of the instantaneous amplitude of the output signal B (FIG. 4) from detector 9. Similarly the reference for discriminator 14 is derived from the output of detector 8 via a sampling circuit 16. The sampling circuit 16 provides, as a reference for discriminator 14, $\frac{1}{3}$ of the output waveform A (FIG. 4) of the detector 8.

The outputs of the discriminators 13 and 14 are applied to a bistable circuit 17 so that as the output waveform A of detector 8 exceeds the aforesaid threshold established by $\frac{1}{3}$ of waveform B, bistable 17 is switched to provide an output on its output lead 18. Correspondingly, as the output waveform B (FIG. 1) of detector 9 exceeds the aforesaid threshold provided by $\frac{1}{3}$ of the output waveform A (FIG. 1) of detector 8, bistable circuit 17 switches to provide an output on its output lead 19.

The output of detector 8 is also connected to a differentiating circuit 20 which provides, at its output, the waveform C of FIG. 4. The output of detector 9 is applied to a differentiating circuit 21 which provides at its output the waveform D of FIG. 4 for the direction of motion of the arrow 4. The output of differentiating circuit 20 is connected to a gate 22 controlled by the output 18 of the bistable circuit 17. The output of differentiating circuit 21 is connected to the gate 23 controlled by the output lead 19 of the bistable circuit 17.

The outputs of the gates 22 and 23 are connected via an OR gate 24 to a terminal 25 upon which a signal correponding to waveform E of FIG. 4 will appear whilst the member 1 is moving in the direction of the arrow 4.

The operation of the circuit can be seen from FIG. 4. As noted before, the outputs 18 and 19 of the bistable are controlled by the threshold circuitry, the output at 18 appearing when the signal A attains a value exceeding the value B/3. This condition will be attained at the times indicated generally at $t_1$, $t_3$ and $t_5$ in FIG. 4. Likewise, the output at 19 appears when the signal B exceeds the value A/3, which occurs at the times $t_2$, $t_4$ and $t_6$. It is to be noted that the times $t_1$–$t_6$ occur during the positivegoing ramps of the signals A and B so that the gates 22 and 23 are open during the periods when the corresponding signals C and D are positive.

However, when the motion of the member 1 reverses direction (i.e., opposite to that of the arrow), it will be apparent that the signals A and B are also reversed so that the steep ramps thereof are now the leading edges of these signals. Also, the signals C and D are inverted because they are now producing the negative voltage during the longer, now negative-going ramps of the signals A and B. It will be seen that, for the signal A, the output of the bistable 17 at 18 thereof appears at the times $t_1'$, $t_3'$ and $t_5'$ whereas the output at 19 appears at the times $t_2'$, $t_4'$ and $t_6'$. Thus, during the time from $t_1'$, to $t_2'$, the gate 22 is conducting (i.e., open) due to the presence of the output at 18 and the now negative voltage portion of the signal C will be passed to the gate 24. Similarly, from $t_2'$, to $t_3'$, the gate 23 will be conducting to pass the now negative voltage portion of the signal D, and so on. During this reverse direction motion, the signal at the terminal 25 goes negative as indicated at 26 in FIG. 4.

The provision of the two slits 10 and 11 and the two detectors 8 and 9 together with the threshold responsive gating results in the circuit always working towards the middle of the rising flank of either waveform A or B, between the limits $A_1$ and $A_2$ thus avoiding the "dead time" which would occur using a single detector with a single slit as the slit passes over the transition from one triangle to the next (corresponding to the negative going pulses in waveforms C and D of FIG. 4).

If the motion of the member 1 ceases, the signal on terminal 25 will disappear or will change polarity as shown at 26 in waveform F of FIG. 4, if a change in direction of movement is experienced. This indication that the motion of the member 1 has ceased or has reversed in direction may be utilised as desired, for example to terminate the measurements being made by the apparatus 2.

A disadvantage of the circuit shown in FIG. 1 is that the switching points of the bistable 17 will vary if the relative amplitudes or relative mean potentials of the signals A and B change. Such changes can occur as a result of variations in the reflectivity of the pattern or as a result of variations in the supply voltage.

FIG. 5 shows a curcuit which is similar to that of FIG. 1 and incorporates the same parts 1 to 14 and 17 to 25. The circuits 15 and 16 are however replaced by circuits 15' and 16'.

Considering the circuit 15', this includes a capacitor C which is charged through resistor R by the signal A of FIG. 4; and which is discharged through potentiometer P. The charge on the capacitor C reaches an equilibrium value which depends on the mean potential of the waveform A.

Thus for a given waveform A the output from potentiometer P is fixed. This output is used as a reference which is applied to a comparator or discriminator 13. By adjusting the potentiometer P it is possible to arrange for the bistable circuit 17 to switch into a state where it produces an output at 19 when the waveform A has risen to any desired proportion (e.g. ½) of its maximum value. Similarly the potentiometer in circuit 16' can be set so that the bistable circuit 17 switches to provide an output at 18 when the waveform B has risen to any desired proportion of its maximum value.

The effect of circuits 13, 14, 15', 16' and 17 is thus to provide a signal at 18 during the major part of the rising period of each saw-tooth waveform A; and a signal at 19 during the major part of the rising period of each saw-tooth waveform B.

We claim:

1. In an arrangement for determining reversal of motion of a machine part, the combination of detector means and pattern means one of which is attached to the machine part and the other of which is stationary with respect thereto, for producing a sequence of electrical signal waveforms in response to movement of the machine part, each waveform being temporally asymmetrical so that the direction of movement of the machine part is uniquely defined thereby, and means for converting said signal waveforms to an output signal which is at least predominantly of one amplitude in response to movement of the machine part in one direction and is at least predominantly of another amplitude in response to movement of the machine part in the opposite direction.

2. An arrangement as claimed in claim 1 wherein said pattern means comprises a plurality of triangles.

3. An arrangement as claimed in claim 2 and wherein said triangles are arranged in a series with the base of one overlapping the apex of another and preferably again for each triangle in the series the apex leads the base relative to the direction of movement of said pattern.

4. An arrangement as claimed in claim 2 and wherein said detector means comprises two detectors and two apertures provided to view the same series of triangles, the arrangement being such that one aperture views a portion of a triangle approximately mid way along the height (i.e. the dimension in the direction of movement) of the triangle whilst the other aperture is viewing the region of transition between that triangle and the next following triangle.

5. An arrangement as claimed in claim 1 wherein said means for converting comprises a differentiating circuit in order to produce a direct current having a polarity dependent upon the direction of movement of said pattern.

6. An arrangement as claimed in claim 4 and wherein the output of each detector is applied to a respective differentiating circuit the outputs of which are passed through respective gates to a combining circuit, said means for converting also including means for rendering conductive that gate which is connected in the output of that discriminator to which that detector is connected which for the time being is providing an output waveform which is rising between two amplitude levels.

7. An arrangement as claimed in claim 6 and wherein said means last mentioned comprises a bistable circuit which is connected to open one of said gates on one state and the other of said gates in its other state, the state of said bistable circuit being arranged to be controlled by two amplitude discriminator circuits to one of which the output of one detector is connected with a proportion of the output of the other detector as reference and to the other of which the output of the other detector is connected with a proportion of the output of the one detector as reference whereby as the output of the one detector exceeds the threshold provided by the other detector the gate at the output of that discriminating circuit to which the output of the one detector is applied is rendered conductive, and vice versa.

8. An arrangement as claimed in claim 7 and wherein the outputs of said gates are normally connected to a common terminal providing a single output signal the polarity of which is related to the direction of passage of said pattern past said apertures.

9. An arrangement as claimed in claim 1 and wherein said pattern means is formed on a sheet which is adapted to be attached to said machine part.

10. An arrangement as claimed in claim 9 and wherein said sheet is adapted to be attached to said machine part magnetically.

11. An arrangement as claimed in claim 1 and wherein a grating pattern is applied to said machine part to enhance an optical signal reflected therefrom and utilised to monitor the velocity of said machine part.

12. Apparatus for monitoring movement of a moving surface comprising:

(1) pattern defining means which moves with the moving surface;

(2) optical detector means adapted to produce a signal having a value which depends on the amount of light received by it, the detector means being arranged to receive light from different parts of the pattern, depending on the position of the pattern, the pattern being such that the amount of received light decreases when the pattern moves in one direction and increases when the pattern moves in another; and (3) means for differentiating the said value to give a differential signal which distinguishes between movements of the pattern in different directions.

13. Apparatus according to claim claim 12 in which the pattern defining means defines a repeated pattern unit; said detector means comprises two optical detectors provided such that when one receives light from a position between two pattern units, the other receives light from a position exclusive to one of the pattern units; and means is provided for rejecting signals from a detector receiving light from positions between two pattern units.

14. An arrangement as claimed in claim 1 wherein said one amplitude is relatively fixed.

15. A device for testing the efficiency of braking of a machine comprising: indicator means defining markings and adapted to be applied to a component of the machine which component moves when the machine is in operation; detection means adapted to be arranged so as to view the markings on the said component, the said markings being such that the detection means delivers signals which enable the direction of movement to be determined; means for performing a test measurement commencing when a braking operation is begun; and means for stopping the measurement when the said signal indicates that movement in the said direction has stopped.

16. A device in accordance with claim 15 wherein the markings define a repeated shape.

17. A device in accordance with claim 16 wherein the detection means comprises two detectors and switching means arranged to block signals delivered by a detector viewing a transition between repeated elements of the shape.

18. A device in accordance with claim 15 wherein the output of the detection means is connected to differentiating means which delivers the said signal.

19. A device in accordance with claim 15 wherein the indicator means is a sheet which can be fixed to the said component of the machine.

20. A device in accordance with claim 15 wherein the said markings define at least one tapered shape.

21. A device in accordance with claim 15 wherein said markings define at least one area which progressively darkens.

22. An arrangement as claimed in claim 1 or 14 wherein said another amplitude is substantially offset from said one amplitude.

* * * * *